(12) United States Patent
Narayanan et al.

(10) Patent No.: US 8,458,247 B2
(45) Date of Patent: Jun. 4, 2013

(54) SYSTEM AND METHOD FOR GENERATING WEB ANALYTIC REPORTS

(75) Inventors: Babu Ozhur Narayanan, Bangalore (IN); Vineel Chandrakanth Gujjar, Bangalore (IN); Jayanth Kalle Marasanapalle, Bangalore (IN); Daniel Hogan, Oakland, CA (US); Christopher Johannessen, Allentown, PA (US)

(73) Assignee: NBCUniversal Media, LLC, Wilmington, DE (US)

( * ) Notice: Subject to any disclaimer, the term of this patent is extended or adjusted under 35 U.S.C. 154(b) by 349 days.

(21) Appl. No.: 12/846,884

(22) Filed: Jul. 30, 2010

(65) Prior Publication Data

US 2012/0030276 A1 Feb. 2, 2012

(51) Int. Cl.
*G06F 15/16* (2006.01)
*G06F 15/173* (2006.01)

(52) U.S. Cl.
USPC ............ 709/203; 709/224; 709/246; 709/230

(58) Field of Classification Search
None
See application file for complete search history.

(56) References Cited

U.S. PATENT DOCUMENTS

| | | | | |
|---|---|---|---|---|
| 7,600,014 | B2 * | 10/2009 | Russell et al. | 709/224 |
| 2008/0046562 | A1 | 2/2008 | Butler | |
| 2008/0255944 | A1 * | 10/2008 | Shah et al. | 705/14 |
| 2008/0275980 | A1 * | 11/2008 | Hansen | 709/224 |
| 2009/0013173 | A1 * | 1/2009 | Savage | 713/150 |
| 2010/0251128 | A1 * | 9/2010 | Cordasco | 715/736 |

\* cited by examiner

*Primary Examiner* — John B. Walsh
(74) *Attorney, Agent, or Firm* — Fletcher Yoder, P.C.

(57) ABSTRACT

A system for generating web analytic reports is provided. The system includes a processor configured to receive an input web page link, execute a unified tag for the input web page link, and generate unified tagged data based on the executed unified tag. The system also includes a server side translation unit configured to translate the unified tagged data to corresponding client tagged data for each of a plurality of clients. The system further includes a plurality of client side analytical units associated with a corresponding client among the plurality of clients and communicatively coupled to the server side translation unit, wherein at least a portion of the client side analytical units are configured to analyze the corresponding client tagged data for each of the plurality of clients and generate a corresponding client side web analytics report for each of the plurality of clients.

27 Claims, 4 Drawing Sheets

SYSTEM AND METHOD FOR GENERATING WEB ANALYTIC REPORTS

BACKGROUND

The invention relates generally to web analytics, and more particularly, to a system and method for generating web analytic reports.

Generally, different organizations measure online traffic of web users visiting the organization's website to determine, for example, popularity, target advertising, optimization level of website content, and performance and commercial value associated with the websites, sections and specific web pages. The organizations employ various vendors to measure, analyze, and generate reports of the online traffic of web users visiting the website. Conventionally, a specific tag is provided by each vendor that is inserted in each webpage of the website by the organization.

Typically, organizations employ more than one vendors to measure and analyze the online traffic of the web users visiting the website. Therefore, the organizations need to incorporate more than one tag in each webpage. The insertion of multiple tags in a webpage results in several difficulties. One such difficulty includes slower processing of the webpage at a user browser. Furthermore, inserting multiple tags in each webpage is tedious and costly, as the tags in each webpage have to be changed, for example, in case a new vendor is employed or an old vendor is discharged.

Therefore, there is a need for an improved system and method to address the aforementioned issues.

BRIEF DESCRIPTION

In accordance with an embodiment of the invention a system for generating web analytic reports is provided. The system includes a processor configured to receive an input web page link, execute a unified tag for the input web page link, and generate unified tagged data based on the executed unified tag. The system also includes a server side translation unit communicatively coupled to the processor, and configured to translate the unified tagged data to corresponding client tagged data for each of a plurality of clients. The system further includes a plurality of client side analytical units, each client side analytical unit associated with a corresponding client among the plurality of clients and communicatively coupled to the server side translation unit, wherein at least a portion of the client side analytical units are configured to analyze the corresponding client tagged data for each of the plurality of clients and generate a corresponding client side web analytics report for each of the plurality of clients.

In accordance with another embodiment of the invention a server side translation unit is provided. The server side translation unit includes a unified metrics unit configured to receive unified tagged data from a processor. The system also includes a translation unit communicatively coupled to the unified metrics unit and configured to translate the unified tagged data to a corresponding client tagged data for each of a plurality of clients. The server side translation unit further includes a data storage unit communicatively coupled to the translation unit and configured to store the corresponding client tagged data received from the translation unit; wherein the data storage unit transmits the corresponding client tagged data to each of the plurality of clients at a defined time period.

In accordance with yet another embodiment of the invention a method for generating web analytics report is provided. The method includes receiving an input web page link. The method also includes executing a unified tag for the input web page link. The method further includes generating unified tagged data based on the executed unified tag. The method also includes translating the unified tagged data to a corresponding client tagged data for each of a plurality of clients. The method further includes analyzing the corresponding client tagged data for each of the plurality of clients and generating a corresponding client side web analytics report for each of the plurality of clients.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
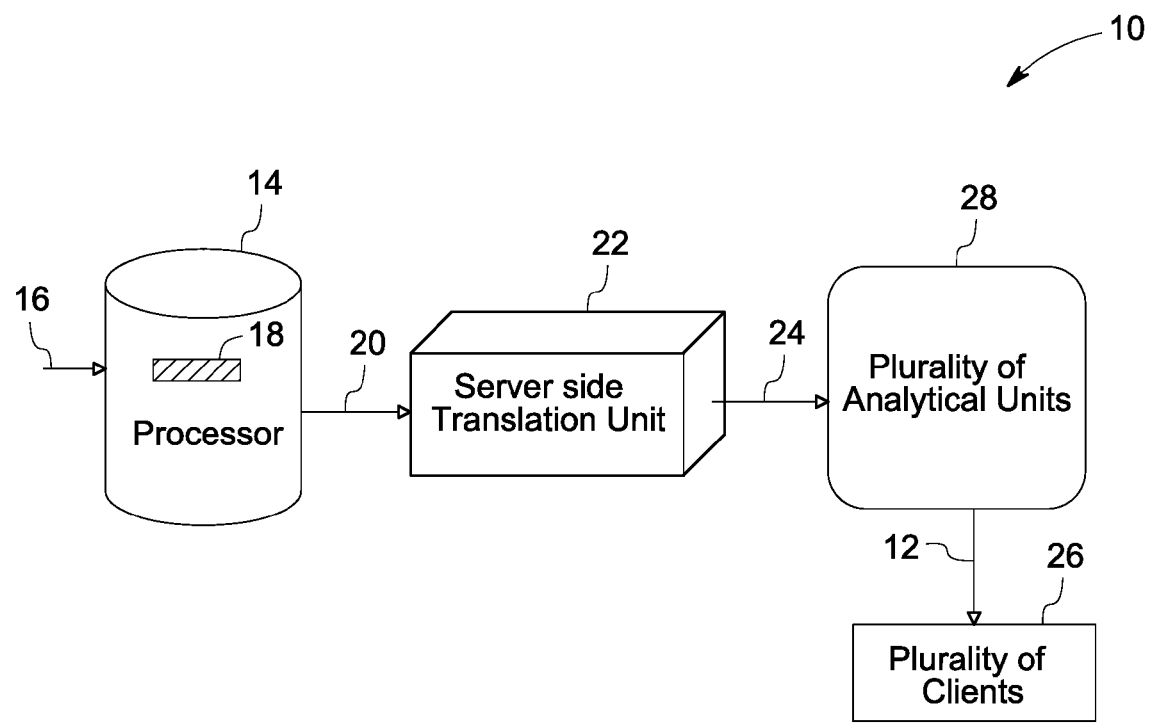
FIG. 1 is a block diagram representation of a system for generating web analytics report in accordance with an embodiment of the invention.

As discussed in detail below, embodiments of the present invention include a system and method of generating web analytic reports. The system includes a processor configured to receive an input web page link from a user. The processor executes a unified tag for the input web page link and generates unified tagged data based on the executed unified tag. The unified tagged data is transmitted to a server side translation unit communicatively coupled to the processor. The server side translation unit is configured to translate the unified tagged data to corresponding client tagged data for each of a plurality of clients. Furthermore, the server side translation unit sends the client tagged data to a plurality of client side analytical units wherein each client side analytical unit is associated with a corresponding client among the plurality of clients. At least a portion of the client side analytical units are configured to analyze the corresponding client tagged data for each of the plurality of clients and generate a corresponding client side web analytics report for each of the plurality of clients.

Conventionally, different organizations employ vendors to analyze and create web analytic reports based on user information collected by the organizations using different methods. Generally, the user information is collected via a webpage tagging. Webpage tagging includes inserting a tag in the metadata of a webpage to collect information of users visiting the webpage. The tag is a code that collects several kinds of user information and transfers the whole user information to the vendors for analytical purposes. The vendors analyze the whole user information and provide web analytic reports to the organizations. However, each vendor provides a tag specific to a particular vendor that needs to be incorporated in the webpage. Furthermore, the organizations employ multiple vendors for analyzing the user information resulting in adding multiple tags in the metadata of the webpage. The multiple tags are processed simultaneously to transfer the user information to the vendors. The simultaneous processing of the multiple tags results in a slower processing and downloading of the webpage and further to a slower Internet surfing.

Furthermore, adding or altering the tags in each webpage is tedious and costly. Therefore, a system and method for reducing the organization's cost and increasing the processing speed of the webpage via implementing a unified tag is described below in detail.

The organizations employ website developers to develop a website for the organization. The website includes multiple web pages and the website developers generate individual web pages via programming. In accordance with the embodiments of the present invention, the website developers insert a unified tag in the metadata of the web page provided by the organizations. The unified tag is created based on the requirements of the organization at different occasions. The unified tag is executed, translated and transmitted to various vendors for analysis and generating web analytic reports. The system for generating web analytic reports is described in greater detail with respect to FIG. 1 below.

FIG. 1 is a block diagram representation of a system 10 for generating web analytics report 12 in accordance with an embodiment of the invention. The system 10 includes a processor 14 configured to receive an input webpage link 16 from a user (not shown). In an embodiment, the processor 14 includes a web browser. The processor 14 executes a unified tag 18 for the input web page link 16 provided in the metadata of the web page and generates unified tagged data 20 based on the executed unified tag 18. In an embodiment the unified tagged data 20 is a unified code. In an exemplary embodiment the unified code is a JavaScript™ code. The processor 14 is communicatively coupled to a server side translation unit 22 and transmits the unified tagged data 20 to the server side translation unit 22. The server side translation unit 22 is configured to translate the unified tagged data 20 to a corresponding client tagged data 24 for each of a plurality of clients 26. In a particular embodiment, the plurality of clients 26 is referred to as vendors in the aforementioned paragraphs. In an embodiment the corresponding client tagged data 24 is a translated code. In an exemplary embodiment the translated code is a JavaScript™ code. The corresponding client tagged data 24 is transferred to a plurality of analytical units 28 communicatively coupled to the server side translation unit 22. Furthermore, each of the plurality of analytical units 28 is associated with a corresponding client among the plurality of clients 26. The plurality of analytical units 28 are configured to analyze the corresponding client tagged data 24 for each of the plurality of clients 26 and generate a corresponding web analytics report 12 for each of the plurality of clients 26. The corresponding web analytic reports 12 may include a client side web analytics report (shown in FIG. 2) or a server side web analytics report (shown in FIG. 3). The system for generating the client side web analytic report 26 is described in detail with respect to FIG. 2 below.

Figure 2:
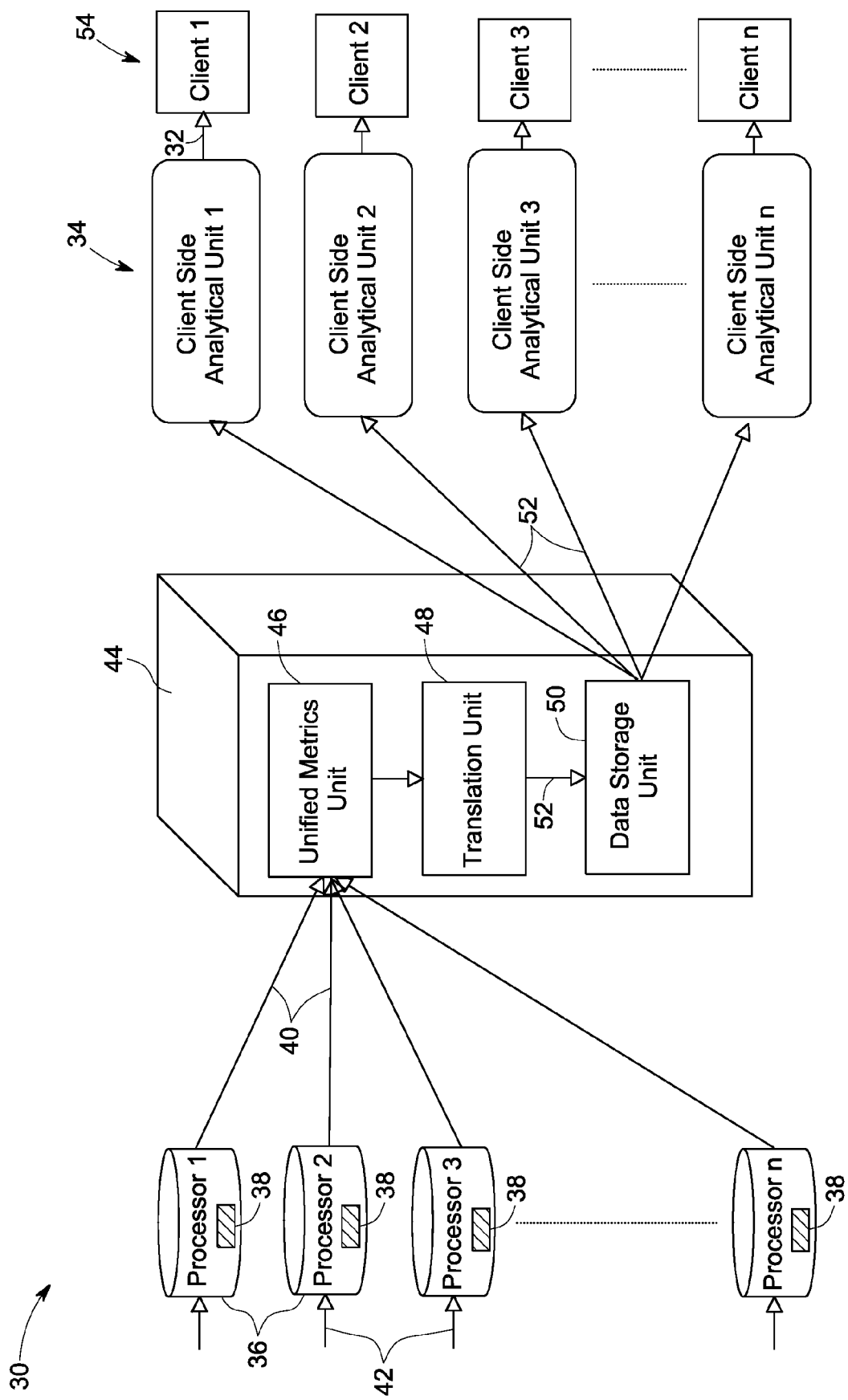
FIG. 2 is a block diagram representation of an exemplary system for generating a client side web analytics report generated via a client side analytical unit in accordance with an embodiment of the invention.

FIG. 2 is a block diagram representation of an exemplary system 30 for generating a client side web analytics report 32 generated via a client side analytical unit 34 in accordance with an embodiment of the invention. The system 30 includes the processor 36 configured to execute the unified tag 38 and generate the unified tagged data 40. In an embodiment the system 30 may include multiple processors 36 to execute multiple unified tags 38 for a plurality of input web page links 42 from multiple users (not shown). The unified tagged data 40 is transmitted to the server side translation unit 44 communicatively coupled to the processor 36.

The server side translation unit 44 includes a unified metrics unit 46, a translation unit 48, and a data storage unit 50. The unified metrics unit 46 receives the unified tagged data 40 from the processor 36. In an embodiment the system 30 may include multiple processors 36 that transmit unified tagged data 40 to the unified metrics unit 46. The unified metrics unit 46 further transmits the unified tagged data 40 to the translation unit 48. The translation unit 48 is configured to translate the unified tagged data 40 to a corresponding client tagged data 52 for each of a plurality of clients 54. Furthermore, the translation unit 48 transfers the corresponding client tagged data 52 to a data storage unit 50 provided in the server side translation unit 44. The data storage unit 50 stores the client tagged data 52 received from the translation unit 48 for a defined period of time. The data storage unit 50 transmits the corresponding client tagged data 48 to each of the plurality of corresponding client analytical units 34 at the defined time period. In an embodiment, the defined time period includes a real time or an interval of time.

The plurality of client side analytical unit 34 receives the corresponding client tagged data 52 from the data storage unit 50 provided in the server side translation unit 44. The corresponding client tagged data 52 is analyzed by at least a portion of the client side analytical units 34 to generate a client side web analytical report 32 for each of the plurality of clients 54. In an embodiment, a server side web analytic report (shown in FIG. 3) may be generated for each of the plurality of client via the server side translation unit. The system (shown below) to generate the server side web analytical report is discussed in greater detail with respect to FIG. 3 below.

Figure 3:
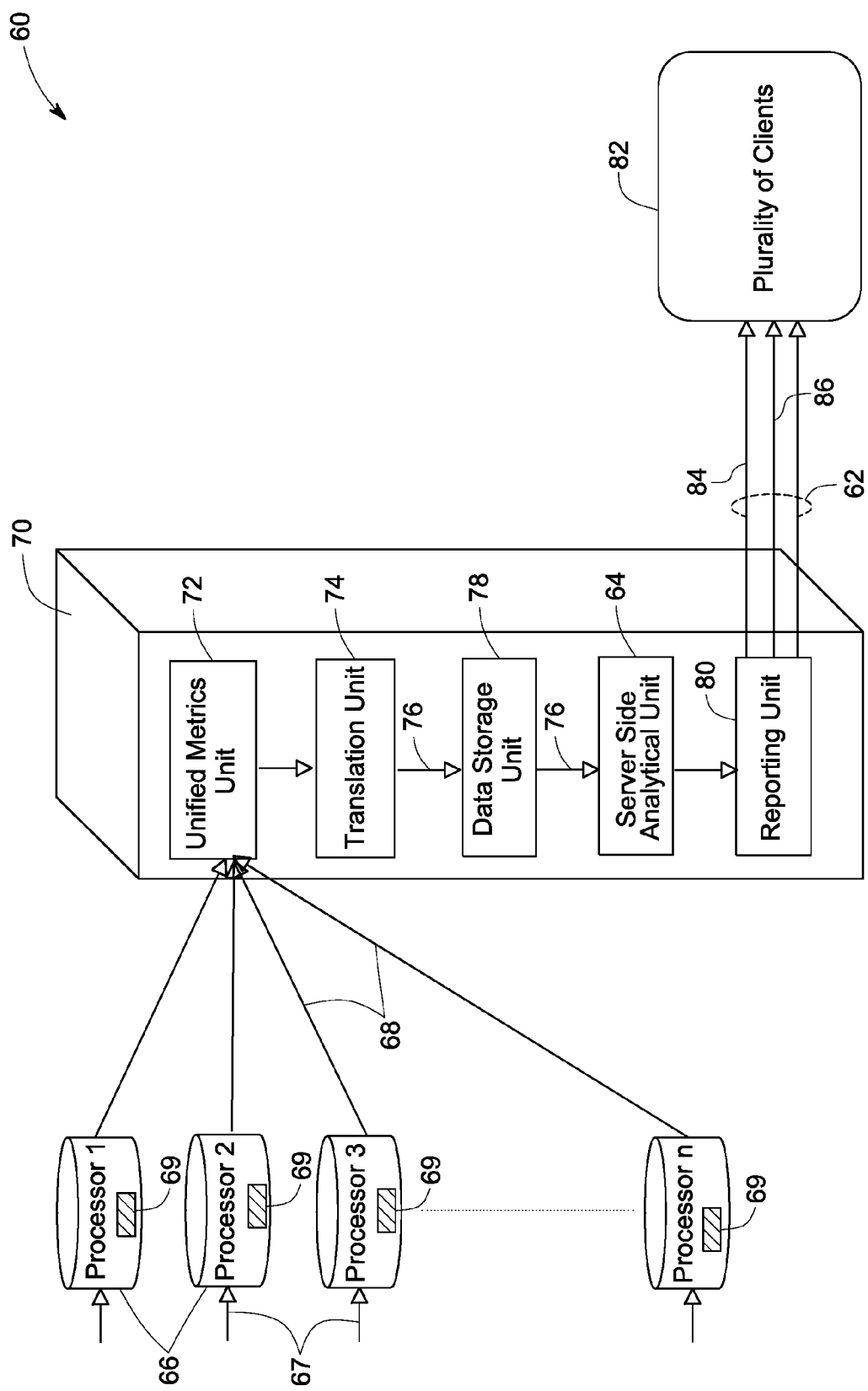
FIG. 3 is a block diagram representation of another exemplary embodiment of the system for generating a server side web analytics report via a server side analytical unit in accordance with an embodiment of the invention.

FIG. 3 is a block diagram representation of another exemplary embodiment of the system 60 for generating a server side web analytics report 62 via a server side analytical unit 64 in accordance with an embodiment of the invention. The system 60 includes the processor 66 configured to generate the unified tagged data 68 as described in the aforementioned FIG. 1 including receiving an input webpage link 67 and executing a unified tag 69 for the webpage link 67 to generate the unified tagged data 68. The system 60 also includes a server side translation unit 70 communicatively coupled to the processors 66. The server side translation unit 70 includes the unified metrics unit 72 and the translation unit 74 configured to translate the unified tagged data 68 to the client tagged data 76 as described in the aforementioned FIG. 2. The server side translation unit 70 includes the data storage unit 78 that stores the client tagged data 76 for a defined period of time.

Furthermore, in an embodiment, the server side translation unit 70 includes a server side analytical unit 64. The server side analytical unit 64 analyzes the client tagged data 76 (shown in FIG. 2) and generates an output indicative of the analyzed client tagged data 76. In another embodiment, the server side translation unit 70 includes a reporting unit 80 communicatively coupled to the server side analytical unit 64. The server side reporting unit 80 generates the server side web analytics report 62 based on the output indicative of the analyzed client tagged data 76. The server side web analytic report 62 is transmitted to the plurality of clients 82 at the defined period of time or the server side web analytic reports 62 can be transmitted to the plurality of clients 82 at their request. In an exemplary embodiment, the server side web analytics report 62 includes an automated report 84 or an on demand report 86. In a particular embodiment the server side web analytics report 62 includes a recommendation, an optimization level and a behavioral analysis.

Figure 4:
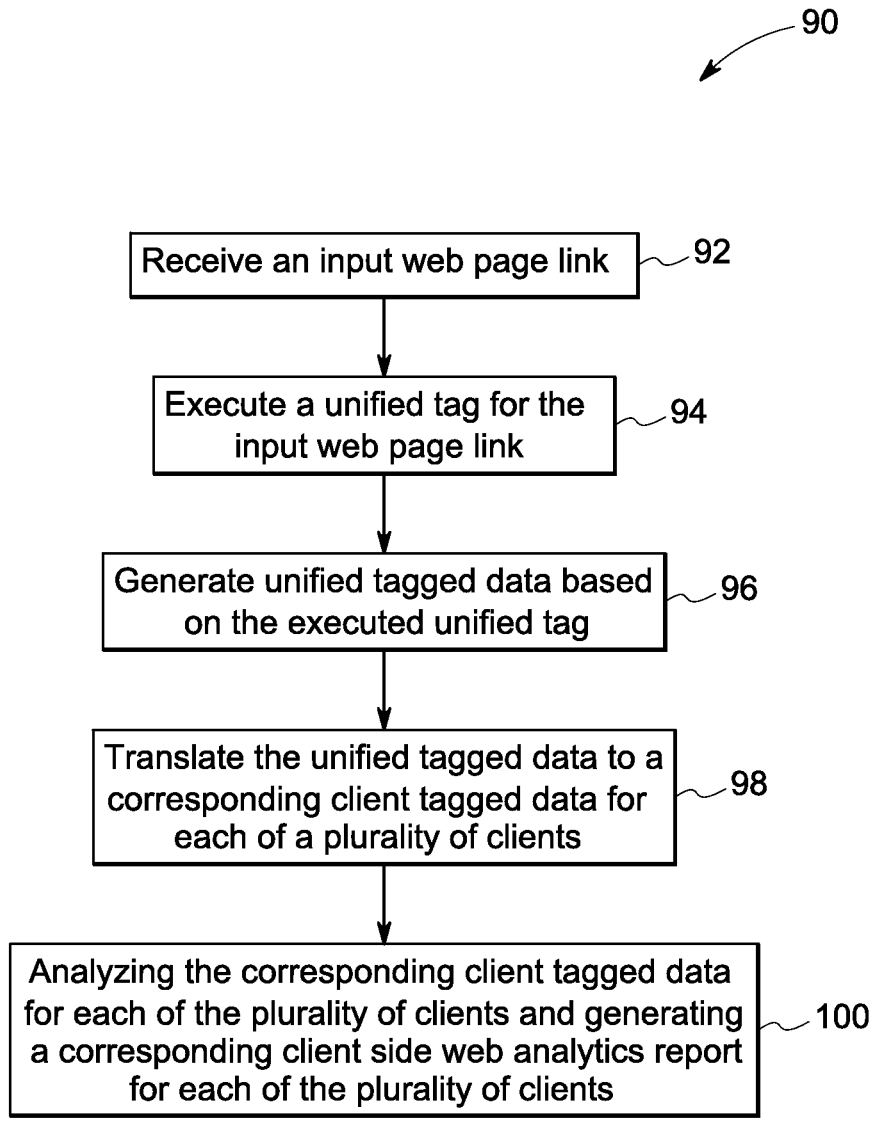
FIG. 4 is a flow chart representing steps involved in a method for generating the web analytics report in accordance with an embodiment of the invention.

FIG. 4 is a flow chart representing steps involved in a method 50 for generating the web analytics report of FIG. 1 in accordance with an embodiment of the invention. The method 90 includes receiving an input webpage link in step 92. The unified tag is executed for the input webpage link in step 94. The executed unified tag generates a unified tagged data in step 96. In an embodiment a unified metrics unit receives the unified tagged data from a processor. The unified tagged data is translated to a corresponding client tagged data for each of a plurality of clients in step 98. In an embodiment a unified JavaScript code is translated to a corresponding translated JavaScript code. In another embodiment the client tagged data is stored in a data storage unit. In a particular embodiment the stored client tagged data is transmitted to each of a plurality of the corresponding client analytical units. The corresponding client tagged data is analyzed to generate the web analytics report in step 100. In an embodiment the corresponding client tagged data is analyzed via the client side analytical unit to generate a client side web analytic report. In another embodiment the server side analytical unit generates the server side web analytic report. In an exemplary embodiment the web analytic reports include a recommendation, an optimization level and a behavioral analysis.

The various embodiments of a system and method for generating web analytic reports described above include a processor, server side translation unit and a plurality of analytical units configured to generate web analytic reports. Thus, these tools and techniques enable the organization to manage the metrics providers to work across multiple web sites without significant performance hits. The system also provides the ability to batch requests to the metrics provider. Furthermore, the tools enable the use of a publish/subscribe model where the clients can choose to pull only the relevant data from the website. The system also provides the ability to exchange client tagged data in a pre-determined indexed format making it convenient for the organization and the client to replicate identical results. This allows websites to send raw data and indexed data so that it is easy to build and verify results for any interested client.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, a client side analytical unit with respect to one embodiment can be adapted for use with the reporting unit described with respect to another embodiment of the invention to report the results of the client side analytical unit. Similarly, the various features described, as well as other known equivalents for each feature, may be mixed and matched by one of ordinary skill in this art to construct additional systems and techniques in accordance with principles of this disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for generating web analytic reports, comprising:
   a processor configured to receive an input web page link, execute a unified tag for the input web page link, and generate unified tagged data based on the executed unified tag;
   a server side translation unit communicatively coupled to the processor, and configured to translate the unified tagged data to corresponding client tagged data for each of a plurality of clients; and
   a plurality of client side analytical units, each client side analytical unit associated with a corresponding client among the plurality of clients and communicatively coupled to the server side translation unit, wherein at least a portion of the client side analytical units are configured to analyze the corresponding client tagged data for each of the plurality of clients and generate a corresponding client side web analytics report for each of the plurality of clients.

2. The system of claim 1, wherein the processor comprises a web browser.

3. The system of claim 1, wherein the server side translation unit comprises a unified metrics unit.

4. The system of claim 3, wherein the unified metrics unit is configured to receive the client tagged data.

5. The system of claim 1, wherein the server side translation unit comprises a data storage unit.

6. The system of claim 5, wherein the data storage unit is configured to store the client tagged data and transmit the corresponding client tagged data to each of the plurality of corresponding client analytical units at a defined time period.

7. The system of claim 6, wherein the defined time period comprises a real time or an interval of time.

8. A server side translation unit, comprising:
   a unified metrics unit configured to receive unified tagged data from a processor;
   a translation unit communicatively coupled to the unified metrics unit and configured to translate the unified tagged data to a corresponding client tagged data for each of a plurality of clients; and
   a data storage unit communicatively coupled to the translation unit and configured to store the corresponding client tagged data received from the translation unit; wherein the data storage unit transmits the corresponding client tagged data to each of the plurality of clients at a defined time period.

9. The server side translation unit of claim 8, further comprises a server side analytical unit.

10. The server side translation unit of claim 9, wherein the server side analytical unit analyzes the client tagged data and generates an output indicative of the analyzed client tagged data.

11. The server side translation unit of claim 8, further comprises a server side reporting unit communicatively coupled to the server side analytical unit.

12. The server side translation unit of claim 11, wherein the server side reporting unit generates a server side web analytics report based on the output indicative of the analyzed client tagged data.

13. The server side translation unit of claim 12, wherein the server side web analytics report comprises an automated report or an on-demand report.

14. The server side translation unit of claim 12, wherein the server side web analytic report comprises a recommendation, an optimization level, and a behavioral analysis.

15. The server side translation unit of claim 8, wherein the unified tagged data comprises a unified code.

16. The server side translation unit of claim 15, wherein the unified code comprises a JavaScript code.

17. The server side translation unit of claim 8, wherein the client tagged data comprises a corresponding translated code.

18. The server side translation unit of claim 17, wherein the corresponding translated code comprises a JavaScript code.

19. A method for generating web analytic reports comprising:
 receiving an input web page link;
 executing a unified tag for the input web page link;
 generating unified tagged data based on the executed unified tag;
 translating the unified tagged data to a corresponding client tagged data for each of a plurality of clients; and
 analyzing the corresponding client tagged data for each of the plurality of clients and generating a corresponding web analytics report for each of the plurality of clients.

20. The method of claim 19, further comprising receiving the unified tagged data from a processor.

21. The method of claim 19, further comprising storing the client tagged data in a data storage unit.

22. The method of claim 21, further comprising transmitting the stored client tagged data to each of the corresponding plurality of clients.

23. The method of claim 22, wherein translating the unified tagged data to a corresponding client tagged data comprising translating a unified encrypted code to a translated encrypted code.

24. The method of claim 19, wherein analyzing the client tagged data comprising analyzing via a client side analytical unit or server side analytical unit.

25. The method of claim 19, wherein generating web analytic reports comprising generating client side web analytic reports or server side web analytic reports.

26. The method of claim 25, wherein generating the server side web analytic reports comprises providing a recommendation, an optimization level, and a behavioral analysis.

27. A system for generating web analytic reports, comprising:
 a client side analytical unit associated with a corresponding client among a plurality of clients and configured to be communicatively coupled to a server side translation unit communicatively coupled to a processor and configured to translate a unified tagged data to corresponding client tagged data for each of the plurality of clients, wherein the client side analytical unit is configured to analyze corresponding client tagged data for the respective associated client of the plurality of clients, the client tagged data resulting from translation unit of unified tagged data generated by the processor from an executed unified tag for an input web page link, and to generate a corresponding client side web analytics report for the respective associated client of the plurality of clients.

\* \* \* \* \*